(12) United States Patent
Chen et al.

(10) Patent No.: US 10,697,580 B2
(45) Date of Patent: Jun. 30, 2020

(54) ELECTRONIC DEVICE

(71) Applicants: Pai-Feng Chen, Taipei (TW);
Yuan-Ping Chu, Taipei (TW);
Jyh-Chyang Tzou, Taipei (TW);
Cheng-Shiue Jan, Taipei (TW);
Chia-Chi Lin, Taipei (TW); Wei-Hao Lan, Taipei (TW)

(72) Inventors: Pai-Feng Chen, Taipei (TW);
Yuan-Ping Chu, Taipei (TW);
Jyh-Chyang Tzou, Taipei (TW);
Cheng-Shiue Jan, Taipei (TW);
Chia-Chi Lin, Taipei (TW); Wei-Hao Lan, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 15/986,837

(22) Filed: May 23, 2018

(65) Prior Publication Data

US 2018/0340645 A1 Nov. 29, 2018

Related U.S. Application Data

(60) Provisional application No. 62/509,742, filed on May 23, 2017.

(51) Int. Cl.
*F16M 11/12* (2006.01)
*F16M 11/08* (2006.01)
*F16M 11/04* (2006.01)

(52) U.S. Cl.
CPC ......... *F16M 11/126* (2013.01); *F16M 11/045* (2013.01); *F16M 11/048* (2013.01);
(Continued)

(58) Field of Classification Search
CPC ... F16M 11/126; F16M 11/08; F16M 2200/08
(Continued)

(56) References Cited

U.S. PATENT DOCUMENTS

| 7,110,052 B1* | 9/2006 | Faris | H04N 13/246 |
| | | | 349/5 |
| 2007/0236908 A1* | 10/2007 | Yukawa | G06F 1/1615 |
| | | | 362/23.15 |

(Continued)

FOREIGN PATENT DOCUMENTS

| CN | 10629883 | 1/2017 |
| CN | 106657752 | 5/2017 |

(Continued)

OTHER PUBLICATIONS

"Office Action of Taiwan Counterpart Application", dated May 17, 2019, pp. 1-9.

(Continued)

*Primary Examiner* — Muhammad Ijaz
(74) *Attorney, Agent, or Firm* — JCIPRNET

(57) ABSTRACT

An electronic device including a display body, a fixed back cover, at least one movable assembly and at least one supplemented light source is provided. The fixed back cover is disposed on the display body. The moveable assembly is disposed on the display body and located beside the fixed back cover. The supplemented light source is disposed on the movable assembly and located between the movable assembly and the display body. When the movable assembly is moved or rotated from an accommodating position to an operation position, the supplemented light source moves along with the movable assembly from being hidden between the display body and the movable assembly to out of the display body so as to locate beside the display body.

16 Claims, 15 Drawing Sheets

(52) U.S. Cl.
CPC ....... *F16M 11/08* (2013.01); *F16M 2200/063* (2013.01); *F16M 2200/08* (2013.01)

(58) Field of Classification Search
USPC ...................................... 248/917–924, 372.1
See application file for complete search history.

(56) References Cited

U.S. PATENT DOCUMENTS

| | | | | |
|---|---|---|---|---|
| 2009/0059102 | A1* | 3/2009 | Chien | G02F 1/1336 349/5 |
| 2011/0149548 | A1* | 6/2011 | Yang | F21V 5/04 362/84 |
| 2012/0182275 | A1* | 7/2012 | Chen | G09G 5/10 345/207 |

FOREIGN PATENT DOCUMENTS

| | | |
|---|---|---|
| CN | 206178570 | 5/2017 |
| TW | M399368 | 3/2011 |
| TW | 201229995 | 7/2012 |
| TW | I521972 | 2/2016 |
| TW | I599871 | 9/2017 |

OTHER PUBLICATIONS

"Office Action of China Counterpart Application", dated Jan. 8, 2020, p.1-p.10.

* cited by examiner

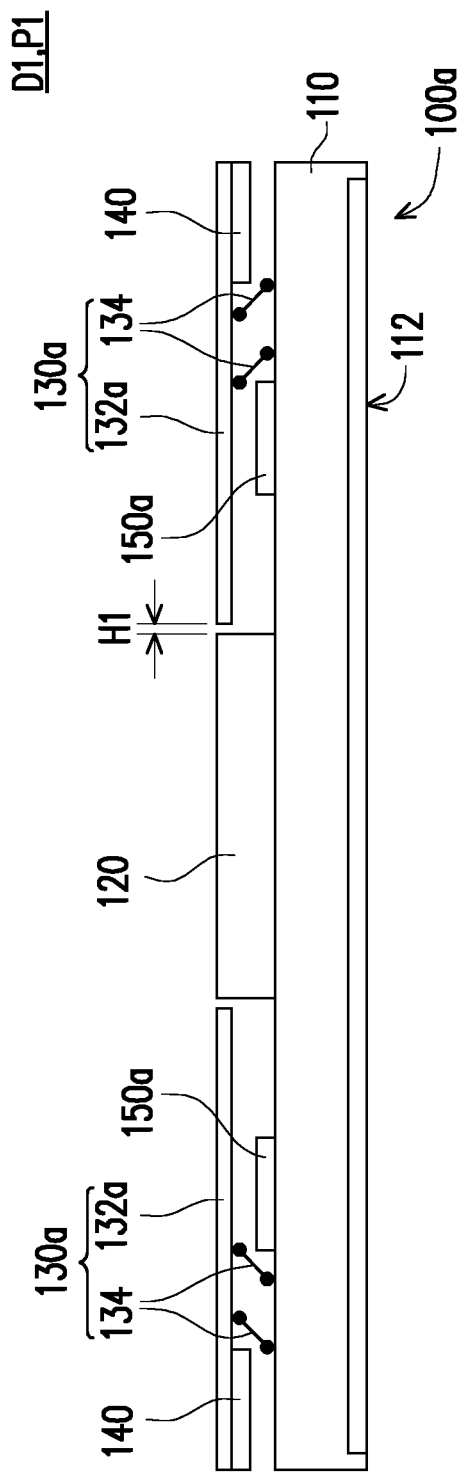
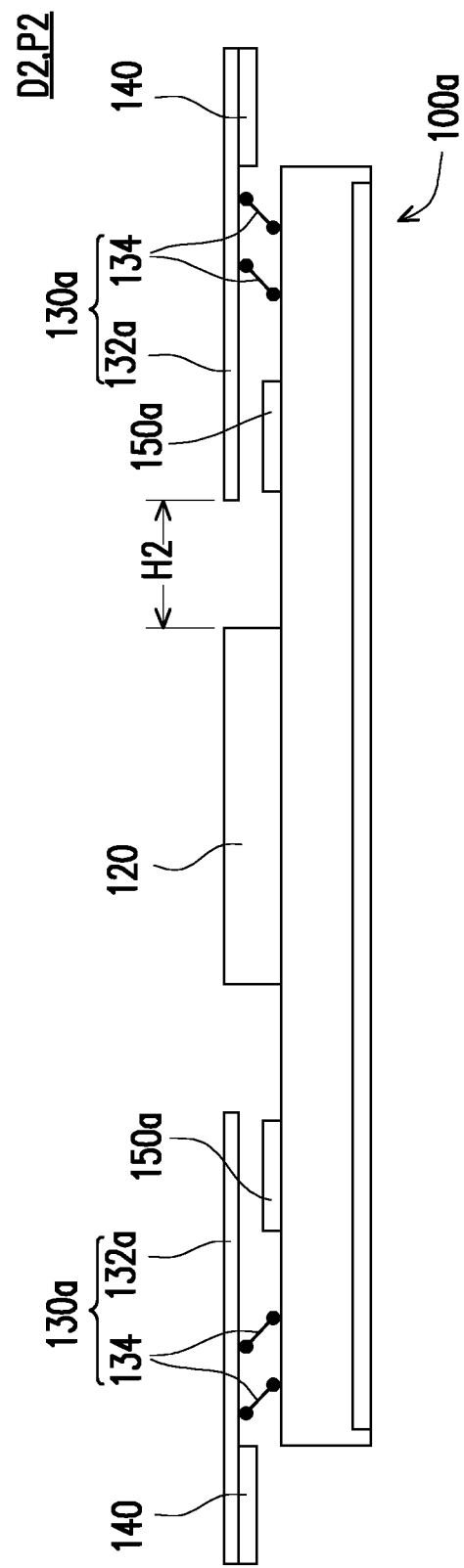
FIG. 2A
FIG. 2B

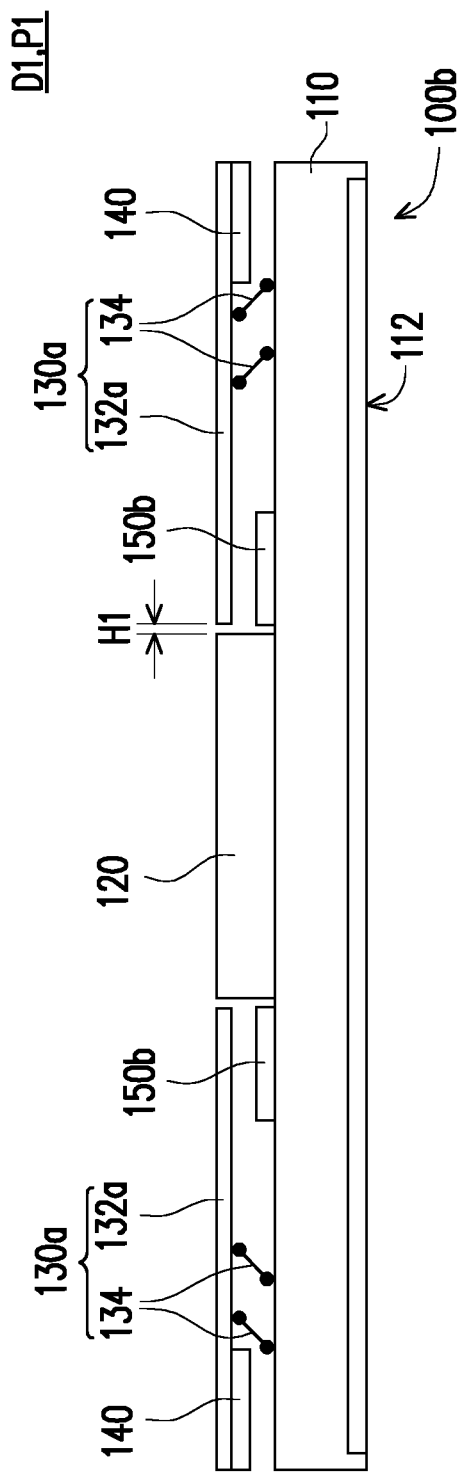
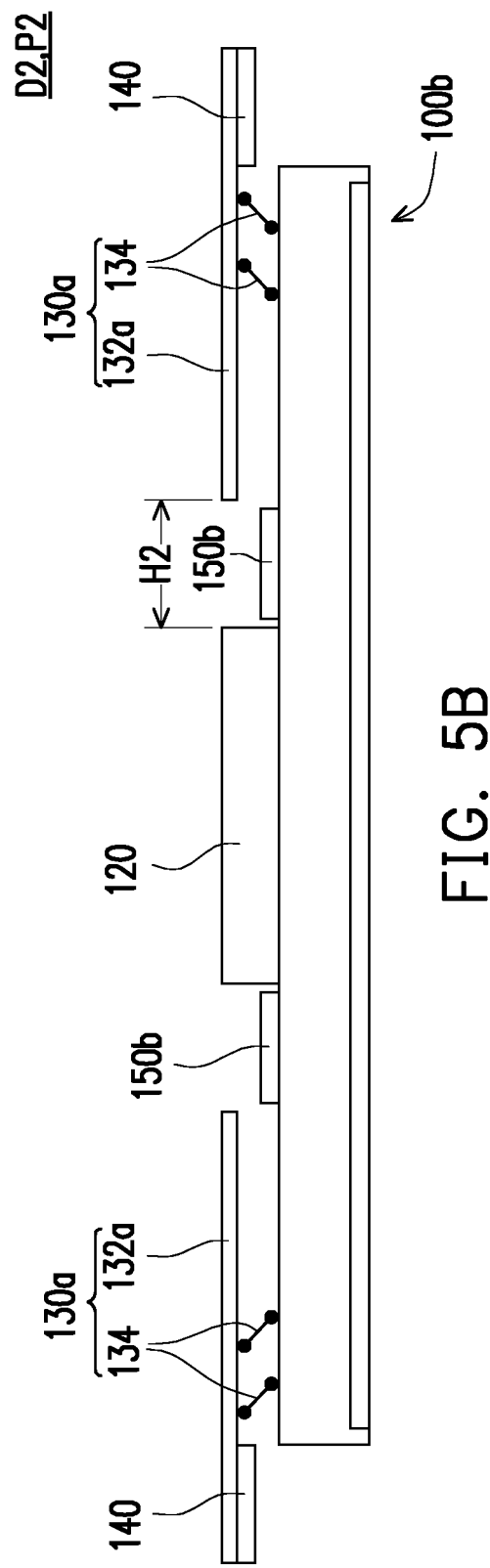
FIG. 5A
FIG. 5B

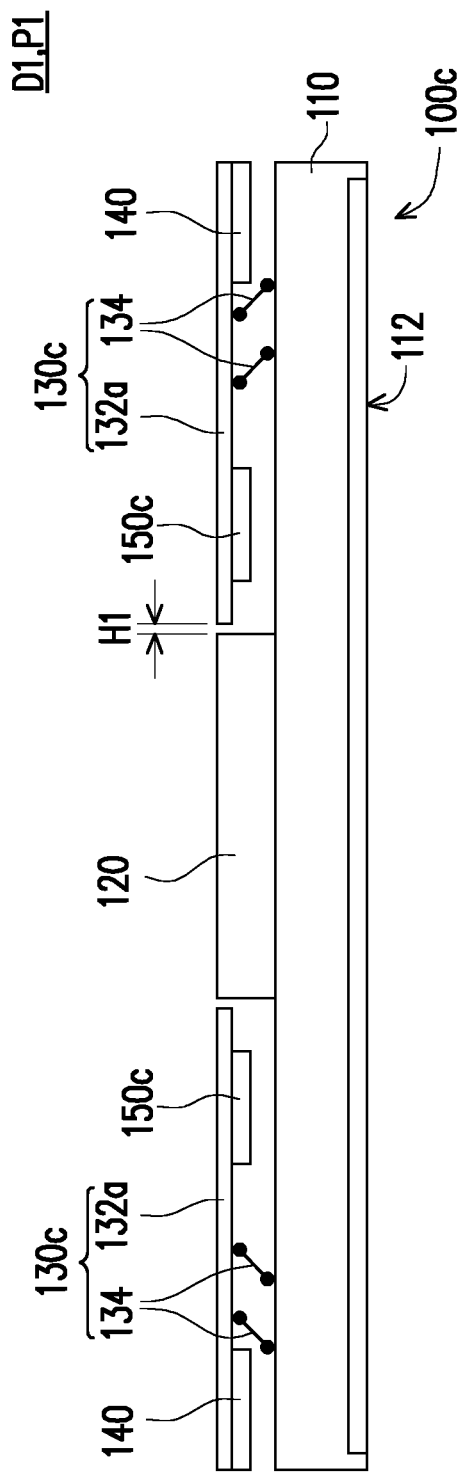
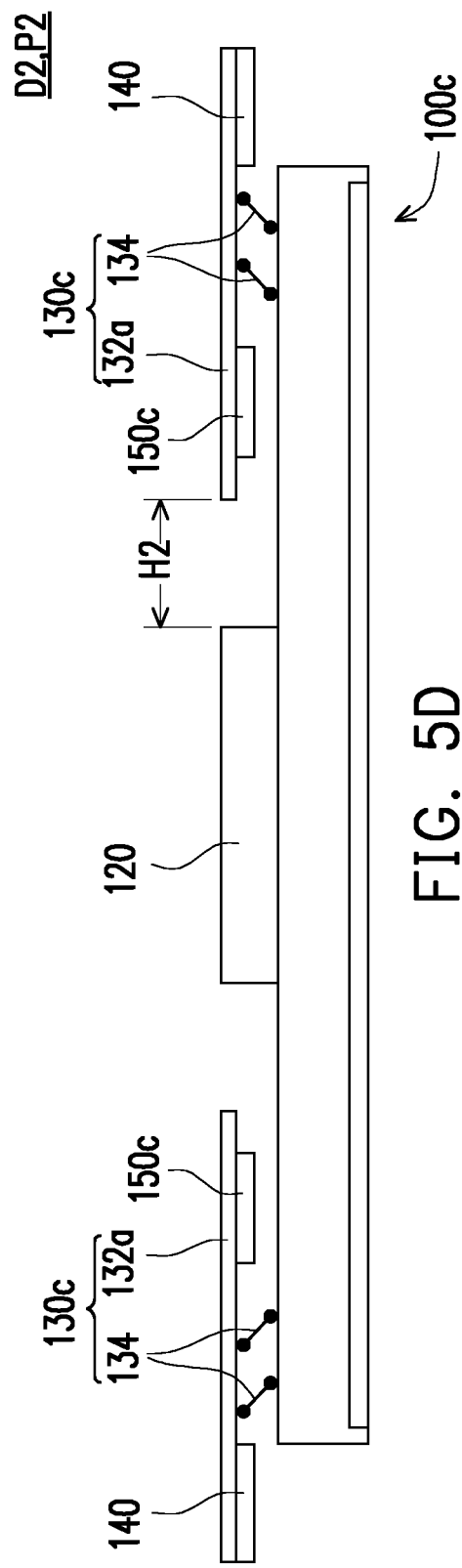

ELECTRONIC DEVICE

CROSS-REFERENCE TO RELATED APPLICATION

This application claims the priority benefit of U.S. provisional application Ser. No. 62/509,742, filed on May 23, 2017. The entirety of the above-mentioned patent application is hereby incorporated by reference herein and made a part of this specification.

BACKGROUND OF THE INVENTION

Field of the Invention

The invention relates to an electronic device, and particularly relates to an electronic device with a light supplement function.

Description of Related Art

Along with development of technology, functions of portable electronic devices such as smart phones, Personal Digital Assistants (PDAs), notebooks or tablet Personal Computers (PCs), etc., are increasingly diversified. Regardless of the main functions of the various types of the portable electronic devices, most of the portable electronic devices provide a camera function for taking photos and video clips, so that the portable electronic devices are often used as digital cameras/video cameras. However, regarding most of the portable electronic devices, a front lens used for self-shooting generally has a low resolution, and considering the manufacturing cost, a supplemented light source is generally not configured. However, when a picture is taken in a place with insufficient environmental light, the picture usually has a low brightness, which results in reduction of image quality. Therefore, how to achieve a better selfie in the environment with insufficient light has become one of the problems that need to be solved.

SUMMARY OF THE INVENTION

The invention is directed to an electronic device, which has a supplemented light source to facilitate a user to supplement light in a specific direction, so as to greatly improve image quality.

The invention provides an electronic device including a display body, a fixed back cover, at least one movable assembly and at least one supplemented light source. The fixed back cover is disposed on the display body. The moveable assembly is disposed on the display body and located beside the fixed back cover. The supplemented light source is disposed on the movable assembly and located between the movable assembly and the display body. When the movable assembly is moved or rotated from an accommodating position to an operation position, the supplemented light source moves along with the movable assembly from being hidden between the display body and the movable assembly to out of the display body so as to locate beside the display body.

In an embodiment of the invention, the electronic device further includes at least one situational light source disposed on the display body.

In an embodiment of the invention, when the movable assembly is located at the accommodating position, the situational light source is hidden between the display body and the movable assembly.

In an embodiment of the invention, when the movable assembly is located at the operation position, the situational light source is hidden between the display body and the movable assembly.

In an embodiment of the invention, when the movable assembly is located at the operation position, the movable assembly exposes the situational light source.

In an embodiment of the invention, the electronic device further includes at least one situational light source disposed on the movable assembly.

In an embodiment of the invention, when the movable assembly is located at the accommodating position, the situational light source is hidden between the display body and the movable assembly.

In an embodiment of the invention, when the movable assembly is located at the operation position, the situational light source is hidden between the display body and the movable assembly.

In an embodiment of the invention, a color temperature of the supplemented light source is between 2700K and 6500K.

In an embodiment of the invention, the movable assembly includes a cover plate and a linkage mechanism. The linkage mechanism is connected between the cover plate and the display body to drive a non-parallel movement of the cover plate relative to the display body.

In an embodiment of the invention, the linkage mechanism includes a first connection rod, a first pivot portion, a second pivot portion, a second connection rod, a third pivot portion, a fourth pivot portion, a third connection rod and a fourth connection rod. The first connection rod is fixed on the display body. The first pivot portion is disposed on the first connection rod. The second pivot portion is disposed on the first connection rod, and is separated from the first pivot portion. The second connection rod is fixed on the cover plate. The third pivot portion is disposed on the second connection rod. The fourth pivot portion is disposed on the second connection rod, and is separated from the third pivot portion. The third connection rod is pivotally connected to the first pivot portion and the third pivot portion. The fourth connection rod is pivotally connected to the second pivot portion and the fourth pivot portion.

In an embodiment of the invention, the third connection rod and the fourth connection rod are adapted to first move upward from a first tilt direction and then tilt toward a second tilt direction to drive the third pivot portion and the fourth pivot portion to move from a place adjacent to the fixed back cover toward a direction away from the fixed back cover, so as to drive the movable assembly to move from the accommodating position to the operation position.

In an embodiment of the invention, when the movable assembly is located at the accommodating position, the movable assembly and the fixed back cover have a first horizontal gap therebetween.

In an embodiment of the invention, when the movable assembly is located at the operation position, the movable assembly and the fixed back cover have a second horizontal gap therebetween, and the second horizontal gap is greater than the first horizontal gap.

In an embodiment of the invention, the electronic device further includes a lens assembly disposed on the display body, where an image captured by the lens assembly is displayed on a display surface of the display body.

In an embodiment of the invention, the electronic device further includes a control assembly disposed on the display body, and the display surface is located between the lens assembly and the control assembly. The control assembly is configured to drive the movable assembly to move or rotate from the accommodating position to the operation position.

In an embodiment of the invention, the electronic device further includes a base and a support assembly. The support assembly is disposed between the base and the fixed back cover, and includes a plurality of electric connection ports.

Based on the above description, in the design of the electronic device of the invention, the supplemented light sources are disposed on the movable assemblies and located between the movable assemblies and the display body. When the movable assemblies are moved or rotated from the accommodating position to the operation position, the supplemented light sources move along with the movable assembly from being hidden between the display body and the movable assembly to out of the display body so as to locate beside the two opposite sides of the display body. Therefore, a light supplement effect in the specific direction is achieved. As a result, the electronic device of the invention is adapted to greatly improve the image quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A and FIG. 2B are respectively top views of the electronic device of FIG. 1A and FIG. 1C.

FIG. 5A to FIG. 5B are respectively top views of an electronic device in an initial state and a spread state according to another embodiment of the invention.

FIG. 5C to FIG. 5D are respectively top views of an electronic device in an initial state and a spread state according to another embodiment of the invention.

DESCRIPTION OF EMBODIMENTS

Figure 1A:
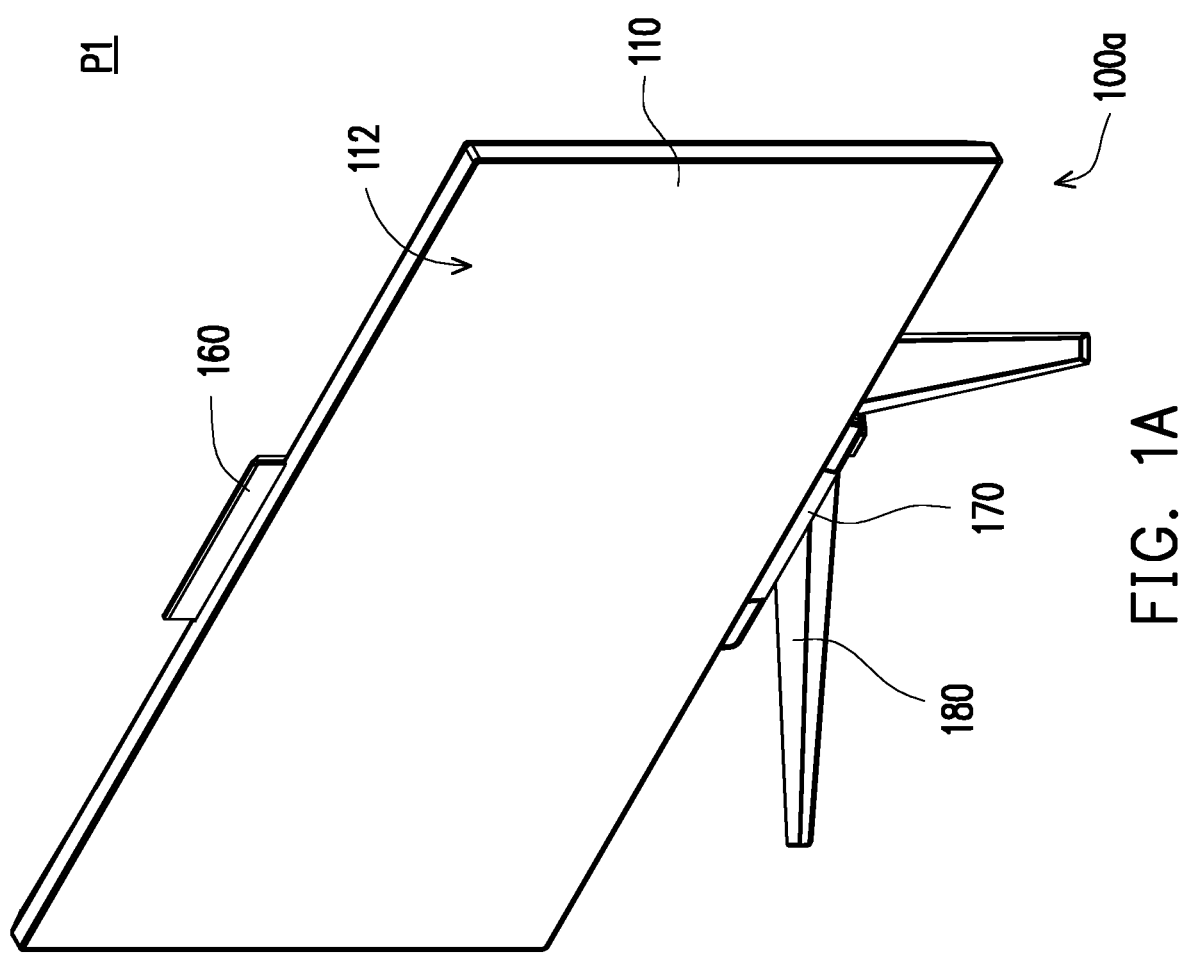
FIG. 1A is a three-dimensional view of an electronic device in an initial state according to an embodiment of the invention.
Figure 1B:
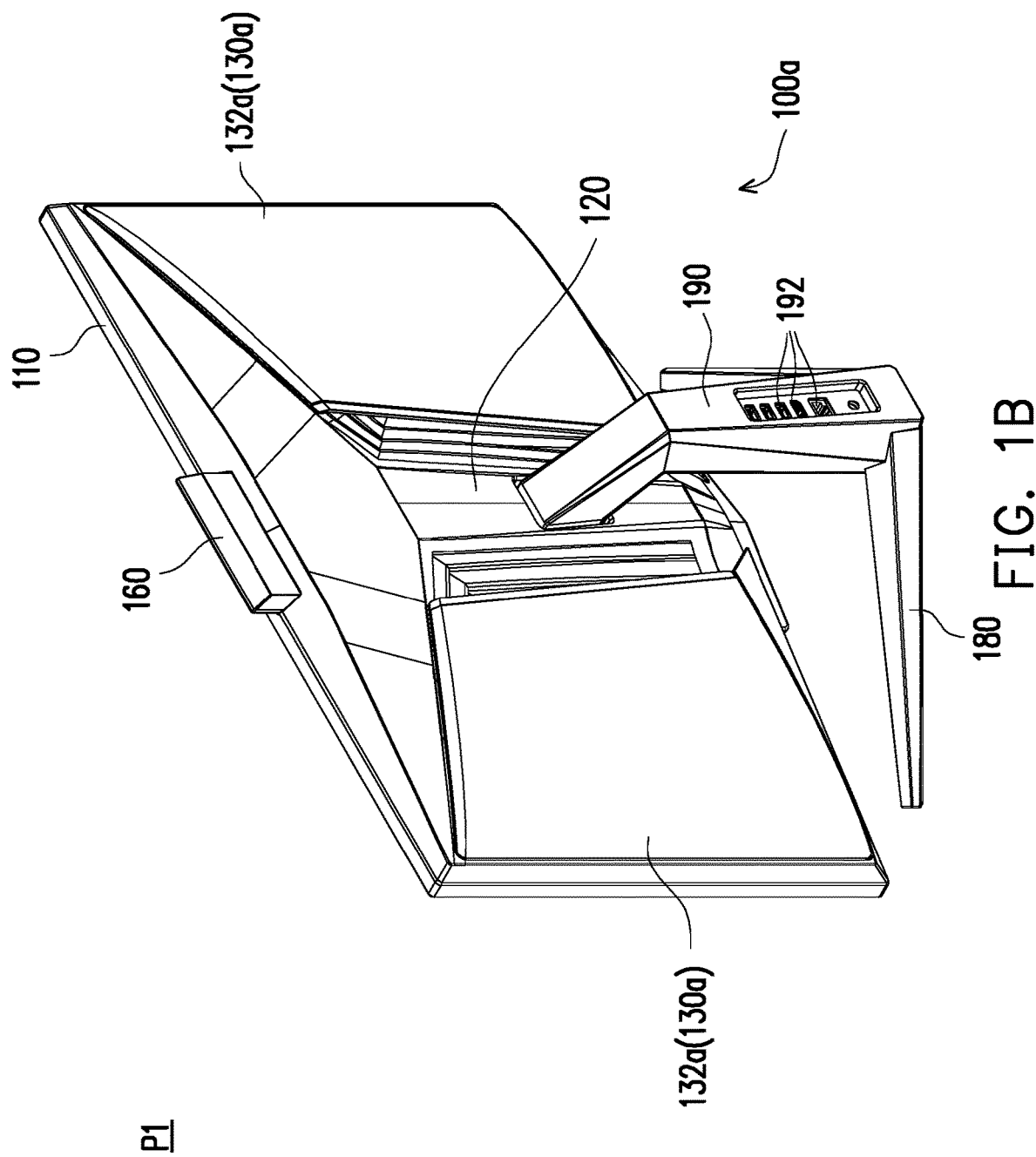
FIG. 1B is a three-dimensional view of the electronic device of FIG. 1A in another viewing angle.
Figure 1C:
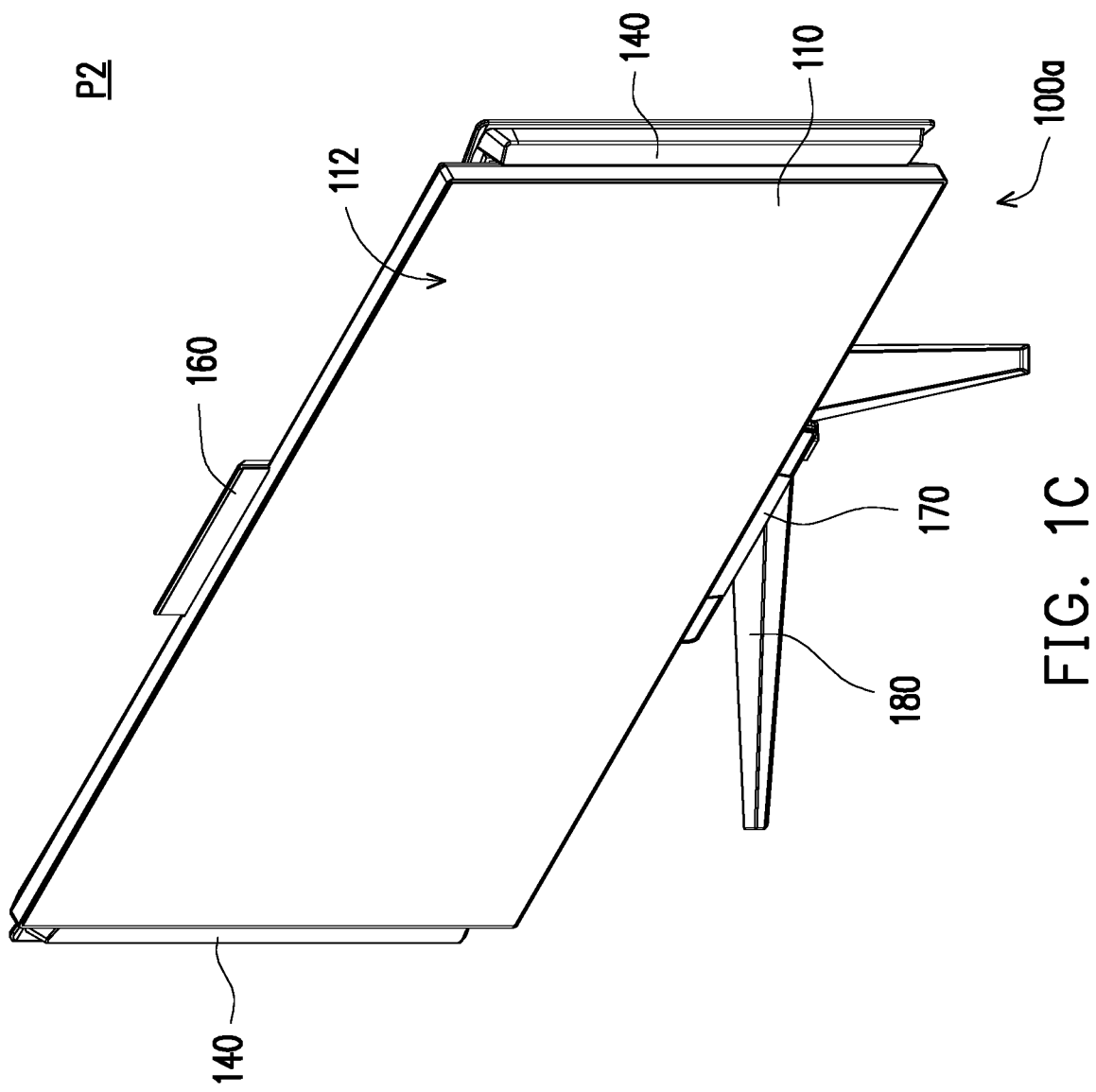
FIG. 1C is a three-dimensional view of the electronic device of FIG. 1A in a spread state.
Figure 1D:
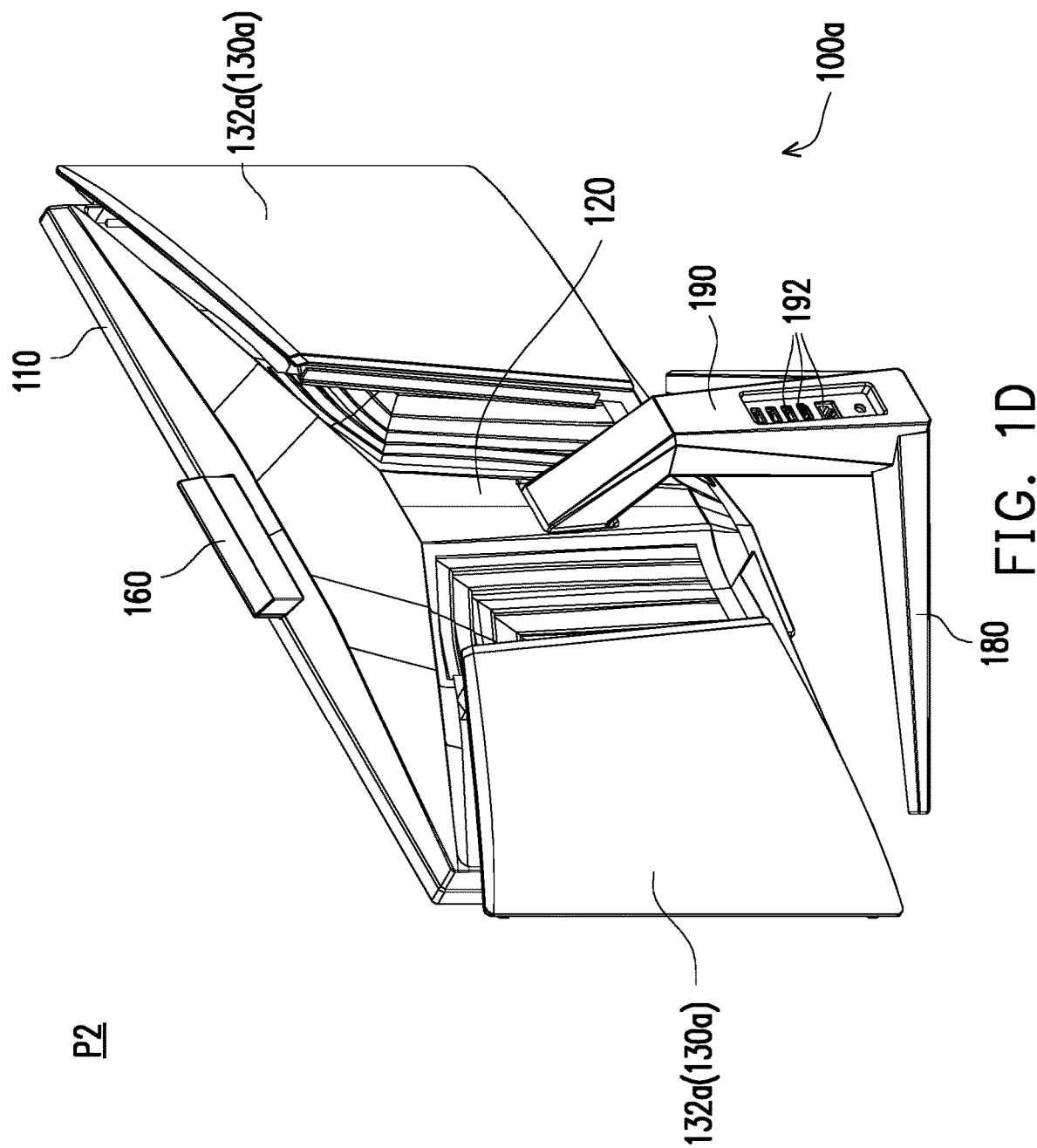
FIG. 1D is a three-dimensional view of the electronic device of FIG. 1C in another viewing angle.
Figure 3A:
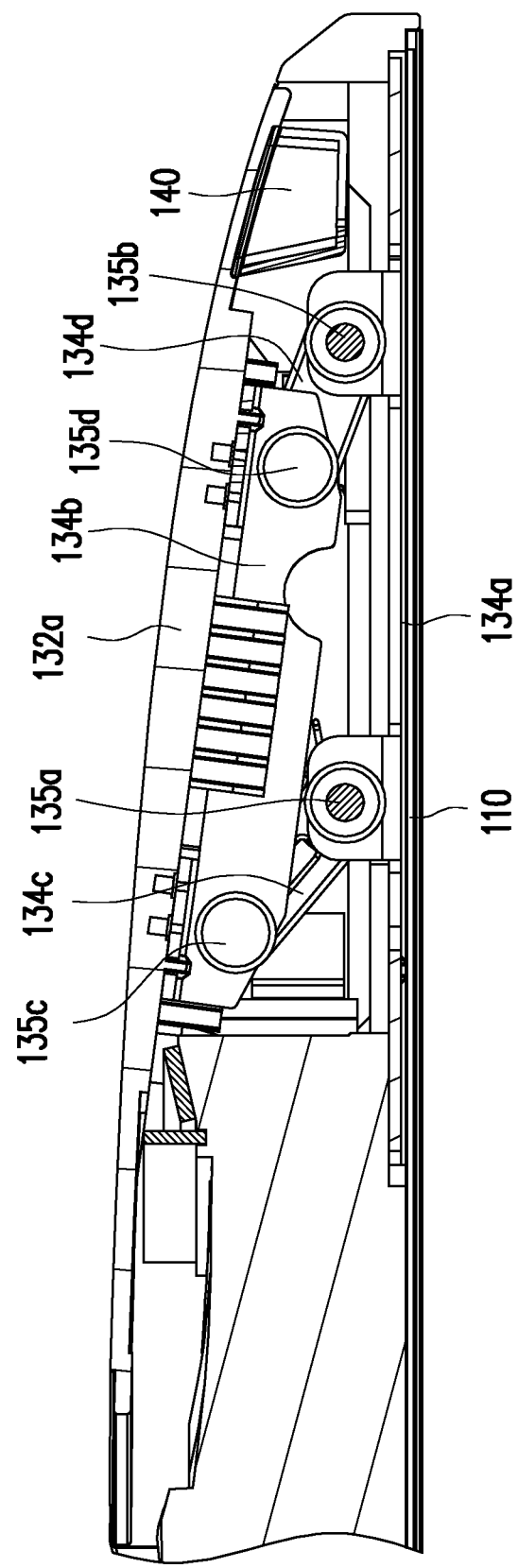
FIG. 3A to FIG. 3C are respectively cross-sectional views of a flow that movable assemblies in the electronic device of FIG. 1A are moved from an accommodating position to an operation position.
Figure 3B:
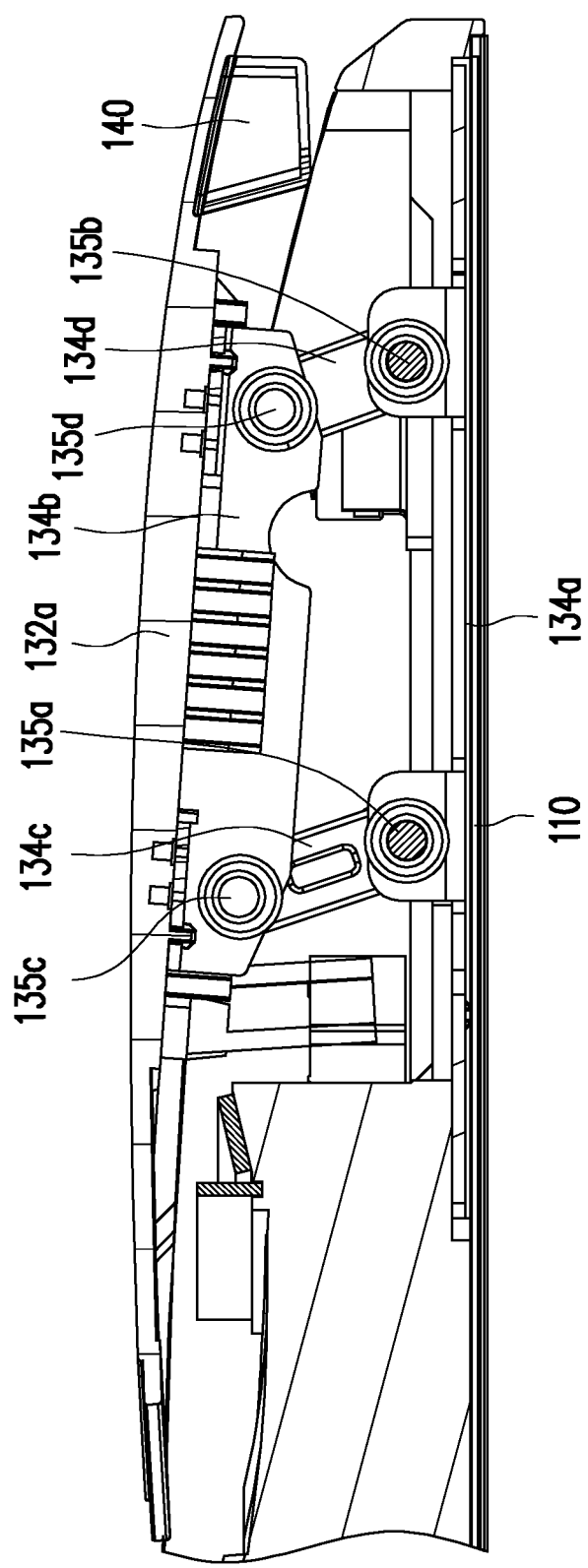
Figure 3C:
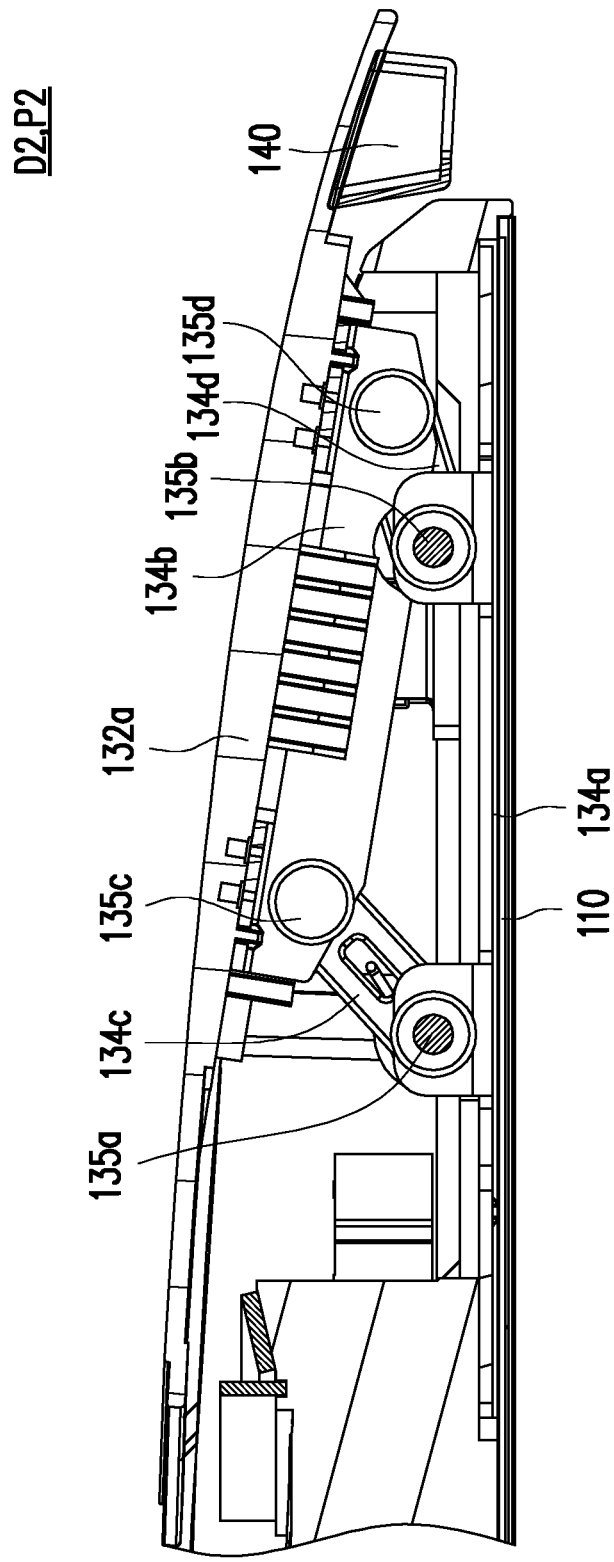
Figure 4A:
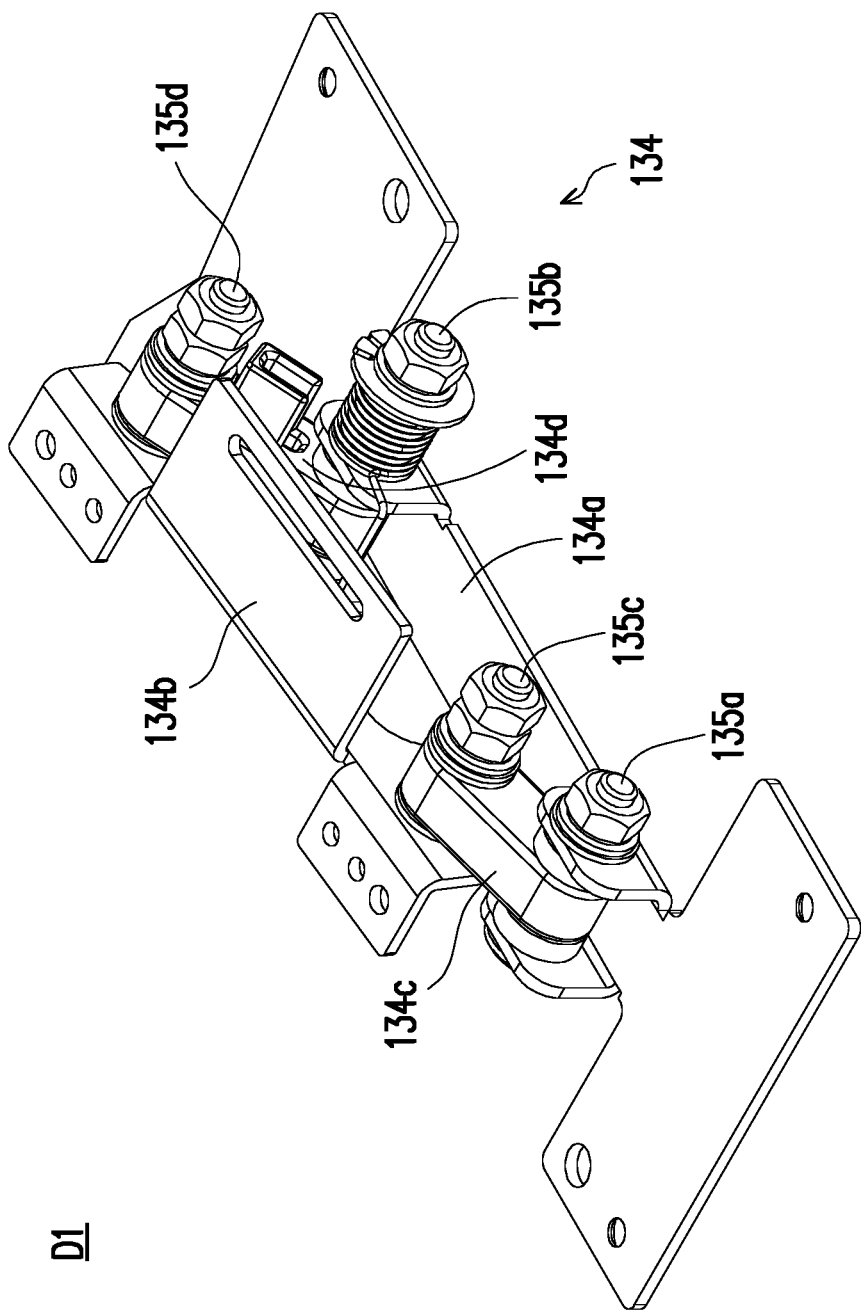
FIG. 4A to FIG. 4C are respectively three-dimensional views of a linkage mechanism in the movable assembly of FIG. 3A to FIG. 3C.
Figure 4B:
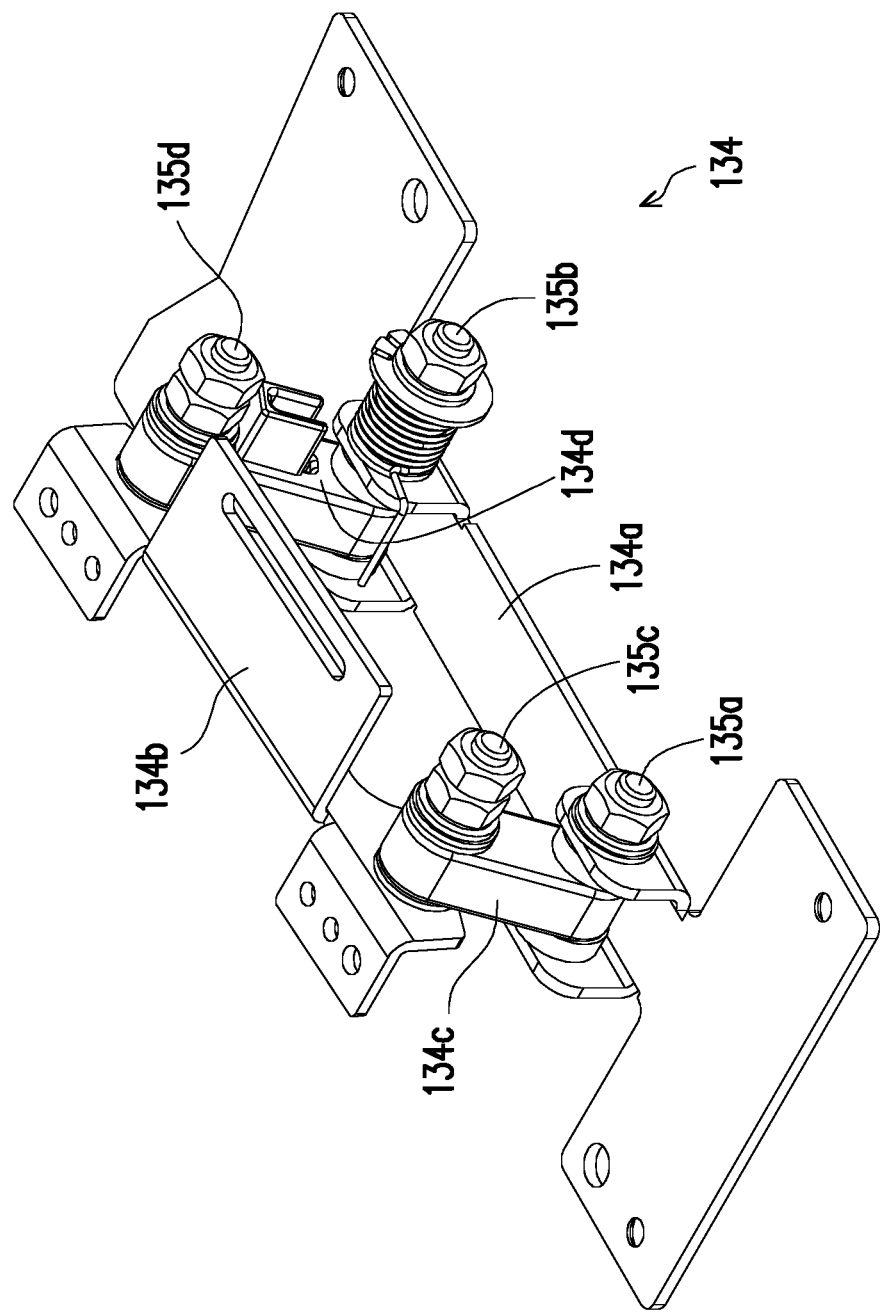
Figure 4C:
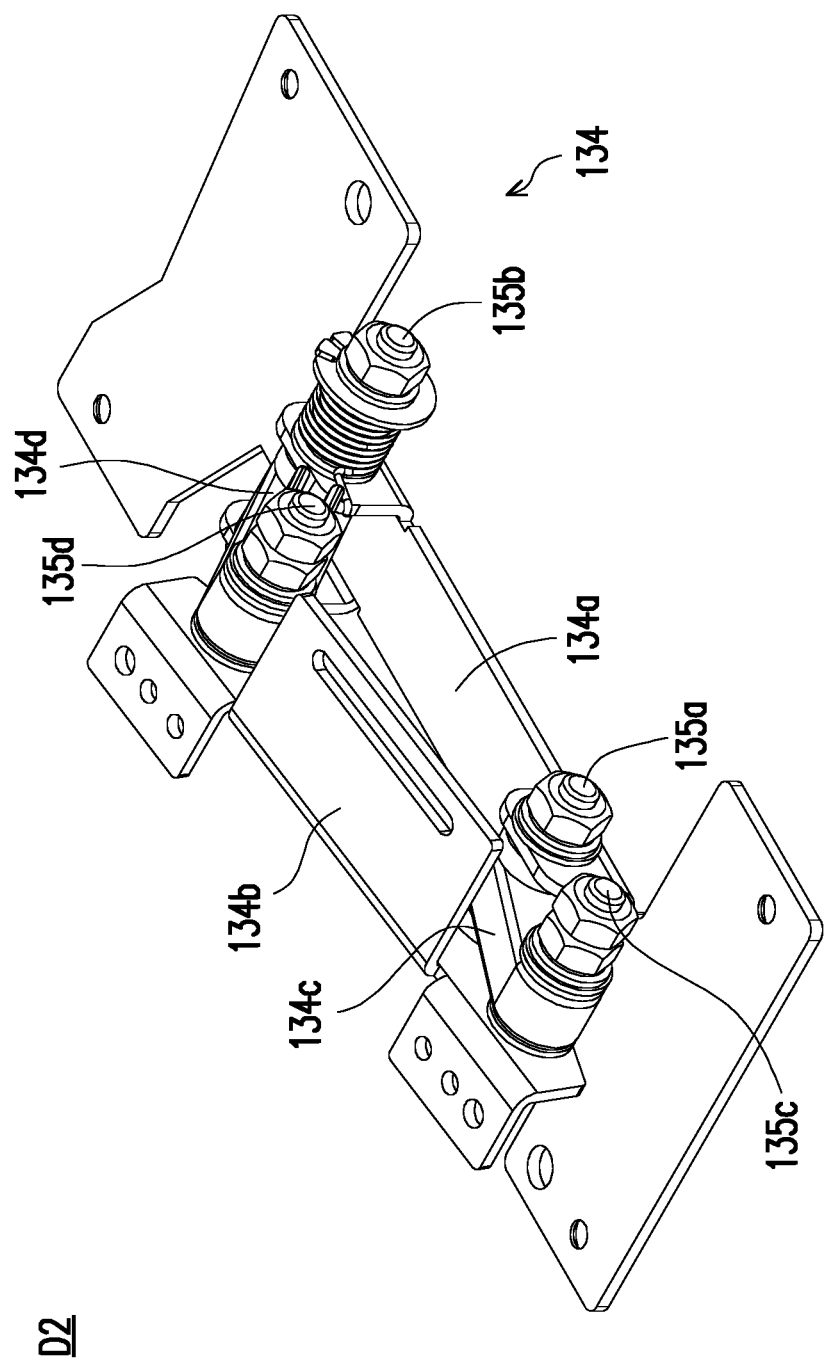

FIG. 1A is a three-dimensional view of an electronic device in an initial state according to an embodiment of the invention. FIG. 1B is a three-dimensional view of the electronic device of FIG. 1A in another viewing angle. FIG. 1C is a three-dimensional view of the electronic device of FIG. 1A in a spread state. FIG. 1D is a three-dimensional view of the electronic device of FIG. 1C in another viewing angle. FIG. 2A and FIG. 2B are respectively top views of the electronic device of FIG. 1A and FIG. 1C. FIG. 3A to FIG. 3C are respectively cross-sectional views of a flow that movable assemblies in the electronic device of FIG. 1A are moved from an accommodating position to an operation position. FIG. 4A to FIG. 4C are respectively three-dimensional views of a linkage mechanism in the movable assembly of FIG. 3A to FIG. 3C.

Referring to FIG. 1A, FIG. 1B, FIG. 1C, FIG. 1D, FIG. 2A and FIG. 2B, the electronic device 100a of the embodiment includes a display body 110, a fixed back cover 120, at least one movable assembly 130a (two movably assemblies are schematically illustrated) and at least one supplemented light source 140 (two supplemented light sources are schematically illustrated). The fixed back cover 120 is disposed on the display body 110. The moveable assemblies 130a are disposed on the display body 110 and located beside two opposite sides of the fixed back cover 120. The supplemented light sources 140 are respectively disposed on the movable assembly 130a and located between the movable assembly 130a and the display body 110. When the movable assemblies 130a are moved from an accommodating position P1 to an operation position P2, the supplemented light sources 140 move along with the movable assemblies 130a from being hidden between the display body 110 and the movable assemblies 130a to out of the display body 110 so as to locate beside the two opposite sides of the display body 110.

In detail, the display body 110 of the embodiment is, for example, a display screen or a touch display screen, which is not limited by the invention. The fixed back cover 120 is disposed and fixed on the display body 110. Each of the movable assemblies 130a includes a cover plate 132a and at least one linkage mechanism 134. The linkage mechanism 134 is connected between the cover plate 132a and the display body 110 to drive a non-parallel movement of the cover plate 132a relative to the display body 110. As shown in FIG. 3A and FIG. 4A, the linkage mechanism 134 of the embodiment includes a first connection rod 134a, a first pivot portion 135a, a second pivot portion 135b, a second connection rod 134b, a third pivot portion 135c, a fourth pivot portion 135d, a third connection rod 134c and a fourth connection rod 134d. The first connection rod 134a is fixed on the display body 110. The first pivot portion 135a is disposed on the first connection rod 134a. The second pivot portion 135b is disposed on the first connection rod 134a, and is separated from the first pivot portion 135a. The second connection rod 134b is fixed on the cover plate 132a. The third pivot portion 135c is disposed on the second connection rod 134b. The fourth pivot portion 135d is disposed on the second connection rod 134b, and is separated from the third pivot portion 135c. The third connection rod 134c is pivotally connected to the first pivot portion 135a and the third pivot portion 135c. The fourth connection rod 134d is pivotally connected to the second pivot portion 135b and the fourth pivot portion 135d. The linkage mechanism 134 is embodied by a four-linkage structure.

Referring to FIG. 2A, FIG. 3A and FIG. 4A, when the movable assemblies 130a are located at the accommodating position P1, the third connection rode 134c and the fourth connection rod 134d are located in a first tilt direction D1, and each of the movable assemblies 130a and the fixed back cover 120 have a first horizontal gap H1 therebetween. In this case, the supplemented light sources 140 are hidden between the display body 110 and the movable assemblies 130a, and the supplemented light sources 140 are, for example, in a close state.

Then, referring to FIG. 2A, FIG. 2B, FIG. 3B, FIG. 3C and FIG. 4B, when the movable assemblies 130a are moved or rotated from the accommodating position P1 to the operation position P2, the third connection rod 134c and the fourth connection rod 134d are adapted to move upward from the first tilt direction D1 to drive the third pivot portion 135c and the fourth pivot portion 135d to move from a place adjacent to the fixed back cover 120 toward a direction away from the fixed back cover 120. In this case, the supplemented light sources 140 are gradually lifted toward a direction away from the display body 110, so as to be opened under a premise of not contacting the back cover of the display body 110.

Then, referring to FIG. 2B, FIG. 3C and FIG. 4C, when the movable assemblies 130a are located at the operation position P2, the third connection rod 134c and the fourth connection rod 134d are located in a second tilt direction D2, and each of the movable assemblies 130a and the fixed back cover 120 have a second horizontal gap H2 therebetween, and the second horizontal gap H2 is greater than the first horizontal gap H1. In the embodiment, the second horizontal gap H2 is equal to the first horizontal gap H1 plus a stroke of the movable assembly 130a. Herein, the supplemented light sources 140 are moved out of the display body 110 to locate at two opposite sides of the display body 110, where the supplemented light sources 140 may present a turn-on state or a turn-off state according to an environmental light source. As shown in FIG. 1C and FIG. 1D, the supplemented light sources 140 are located beside the two opposite sides of the display body 110 to achieve a light supplement effect in a specific direction.

In brief, the third connection rod 134c and the fourth connection rod 134d of the linkage mechanism 134 are adapted to first move upward from the first tilt direction D1 and then tilt toward the second tilt direction D2 to drive the third pivot portion 135c and the fourth pivot portion 135d to move from a place adjacent to the fixed back cover 120 toward a direction away from the fixed back cover 120, so as to drive the movable assemblies 130a to move from the accommodating position P1 to the operation position P2. Through such design, the supplemented light sources 140 are moved along with the movable assemblies 130a from being hidden between the display body 110 and the movable assemblies 130a to out of the display body 110 so as to locate beside the two opposite sides of the display body 110 to achieve the light supplement effect in the specific direction.

Further, a color temperature of each of the supplemented light sources 140 is between 2700K and 6500K, and the supplemented light sources 140 are used for supplementing light when light is insufficient, so as to guarantee clarity of the captured image. The supplemented light sources 140 are, for example, light bars composed of a plurality of Light-Emitting Diodes (LEDs, not shown), which are adapted to provided a partitioned light, a partial light or a full light according to a usage requirement, which is not limited by the invention. Moreover, color lights emitted by the LEDs may be completely same, partially same or completely different. For example, the color light emitted by each of the LEDs is for example, a red light, an orange light, a yellow light, a green light, a blue light, a purple light or an arrangement, a combination or a mixing of the aforementioned colors; or may be a white light, which is not limited by the invention. In brief, the supplemented light sources 140 of the embodiment are adjustable light sources, and are adapted to move out of the display body 110 from being hidden between the display body 110 and the movable assemblies 130a in a sliding (i.e. dragging) manner, so as to achieve the light supplement effect in the specific direction.

It should be noted that the aforementioned electronic device 100a, for example, includes two movable assemblies 130a and two supplemented light sources 140, though the invention is not limited thereto. In other embodiment that is not shown, the electronic device may include only one movable assembly and one supplemented light source disposed on the movable assembly, which is still within a protection range of the invention.

Moreover, the electronic device 100a of the embodiment further includes at least one situational light source 150a (two situational light sources are schematically illustrated) disposed on the display body 110, such that the electronic device 100a may be more elegant in appearance. As shown in FIG. 2A, when the movable assemblies 130a are located at the accommodating position P1, the situational light sources 150a are hidden between the display body 110 and the movable assemblies 130a, and present a turn-on state or a turn-off state according to a usage requirement of the user. As shown in FIG. 2B, when the movable assemblies 130a are located at the operation position P2, the situational light sources 150a are hidden between the display body 110 and the movable assemblies 130a, and present the turn-on state or the turn-off state according to the usage requirement of the user. Namely, the situational light sources 150a of the embodiment are all hidden between the display body 110 and the movable assembly 130a regardless of the accommodating position P1 or the operation position P2, and present the turn-on state or the turn-off state according to the usage requirement of the user. If the situational light sources 150a present the turn-on state, the provided light may emit out of the movable assemblies 130a through the first horizontal gap H1 or the second horizontal gap H2 to make the appearance of the electronic device 100a more beautiful. Moreover, the color lights emitted from the situational light sources 150a may be completely same, partially same or completely different. For example, each of the situational light sources 150a may emit a red light, an orange light, a yellow light, a green light, a blue light, a purple light or an arrangement, a combination or a mixing of the aforementioned colors; or may be a white light, which is not limited by the invention.

Moreover, the electronic device 100a of the embodiment further includes a lens assembly 160 disposed on the display body 110, where an image captured by the lens assembly 160 is displayed on a display surface 112 of the display body 110. In brief, the lens assembly 160 has a function of a camera and/or a video camera. Moreover, the electronic device 100a further includes a control assembly 170 disposed on the display body 110, and the display surface 112 is located between the lens assembly 160 and the control assembly 170. In an embodiment, the control assembly 170 may be used for driving the movable assemblies 130a to move from the accommodating position P1 to the operation position P2. In another embodiment, the control assembly 170 is, for example, a touch panel, a microphone or a combination thereof. Moreover, the electronic device 100a further includes a base 180 and a support assembly 190. The support assembly 190 is disposed between the base 180 and the fixed back cover 120, and includes a plurality of electric connection ports 192. External electric connection parts (not shown) may be electrically connected to the display body 110 through the electric connection ports 192 of the support assembly 190. In order to satisfy the usage requirement, in an embodiment, a connector, for example, a type C connector may be configured on a back surface of the display body 110, which is still within the protection range of the invention.

Further, a main function of the supplemented light sources 140 is to increase an on-site light source. For example, in an embodiment, when a live streaming or a related operation is performed, the lens assembly 160 on the top of the display body 110 first detects the on-site light source. If the lens assembly 160 detects that the on-site light source is too dim, the lens assembly 160 automatically turns on the supplemented light sources 140 to light the user. Namely, the lens assembly 160 may automatically adjusts an optimal light supplement amount for the user. In another embodiment, since a distance between the user and the display surface 112 of the display body 110 is probably constantly changed or even a direction is changed, all parameters are automatically adjusted through the detection of the lens assembly 160. Namely, different supplemented light brightness adjustments are performed according to the distance between the user and the display surface 112 of the display body 110. For example, when the distance is relatively long, the supplemented light brightness may be decreased or a supplemented light angle may be enlarged; and when the distance is relatively short, the supplemented light brightness may be increased or the supplemented light angle may be reduced. Moreover, in another embodiment, the lens assembly 160 may be adopted to scan and detect an expression of a live streaming host, and the supplemented light sources 140 may produce different brightness variations according to the expression.

In another embodiment, when specific application software receives a setting related notification, the supplemented light sources 140 may provide a special light effect to remind the user. Even when the display body 110 is turned off, the supplemented light sources 140 may provide a special light effect to remind the user. Moreover, in another embodiment, since one of the main sources of income for live streaming is subscriptions of viewers, each time when a viewer is subscribed, a special animation is generally appeared on the display surface 112 of the display body 110. Through the design of the supplemented light sources 140, when the subscription appears, the supplemented light sources 140 may provide various colors to interact with the live streaming host, and the viewers may also view such interaction through the lens assembly 160. In another embodiment, a combination of Artificial Intelligence (AI) and the supplemented light sources 140 may be adopted to implement more interactions with the user.

It should be noted that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

FIG. 5A to FIG. 5B are respectively top views of an electronic device in an initial state and a spread state according to another embodiment of the invention. Referring to FIG. 2B and FIG. 5B, the electronic device 100b of the embodiment is similar to the electronic device 100a of FIG. 2B, and a main difference therebetween is that when the movable assemblies 130b of the electronic device 100b of the embodiment are located at the operation position P2, the movable assemblies 130b expose the situational light sources 150b. In detail, referring to FIG. 5A, when the movable assemblies 130b are located at the accommodating position P1, the supplemented light sources 140 and the situational light sources 150b are all hidden between the display body 110 and the movable assemblies 130b. In this case, the supplemented light sources 140 present the turn-off state, and the situational light sources 150b may present the turn-on state or the turn-off state according to the usage requirement of the user.

Then, referring to FIG. 5B, when the movable assemblies 130b are located at the operation position P2, the supplemented light sources 140 are moved out of the display body 110, and present the turn-on state or the turn-off state according to the usage requirement of the user, so as to achieve the light supplement effect in a specific direction. On the other hand, the situational light sources 150b are exposed by the movable assemblies 130b, and present the turn-on state or the turn-off state according to the usage requirement of the user.

FIG. 5C to FIG. 5D are respectively top views of an electronic device in an initial state and a spread state according to another embodiment of the invention. Referring to FIG. 2A, FIG. 2B, FIG. 5C and FIG. 5D, the electronic device 100c of the embodiment is similar to the electronic device 100a of FIG. 2B, and a main difference therebetween is that the situational light sources 150c of the embodiment are disposed on the movable assemblies 130c.

In detail, referring to FIG. 5C, when the movable assemblies 130c are located at the accommodating position P1, the supplemented light sources 140 and the situational light sources 150c are all hidden between the display body 110 and the movable assemblies 130c. In this case, the supplemented light sources 140 present the turn-off state, and the situational light sources 150c may present the turn-on state or the turn-off state according to the usage requirement of the user.

Then, referring to FIG. 5D, when the movable assemblies 130c are located at the operation position P2, the supplemented light sources 140 are moved out of the display body 110, and present the turn-on state or the turn-off state according to the usage requirement of the user, so as to achieve the light supplement effect in a specific direction. On the other hand, when the movable assemblies 130c are located at the operation position P2, the situational light sources 150c are hidden between the display body 110 and the movable assemblies 130c, and present the turn-on state or the turn-off state according to the usage requirement of the user. Namely, the situational light sources 150c of the embodiment are all hidden between the display body 110 and the movable assembly 130c regardless of the accommodating position P1 or the operation position P2, and present the turn-on state or the turn-off state according to the usage requirement of the user.

Figure 6A:
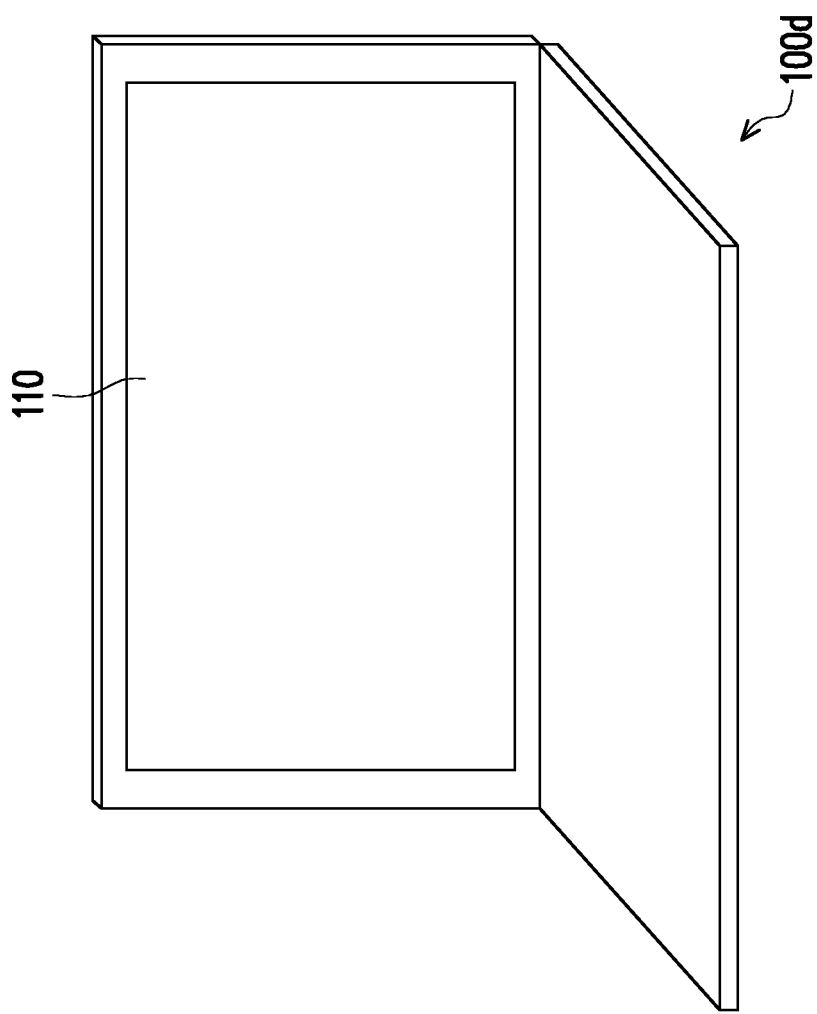
FIG. 6A to FIG. 6B are respectively schematic diagrams of an electronic device in an initial state and a spread state according to another embodiment of the invention.
Figure 6B:
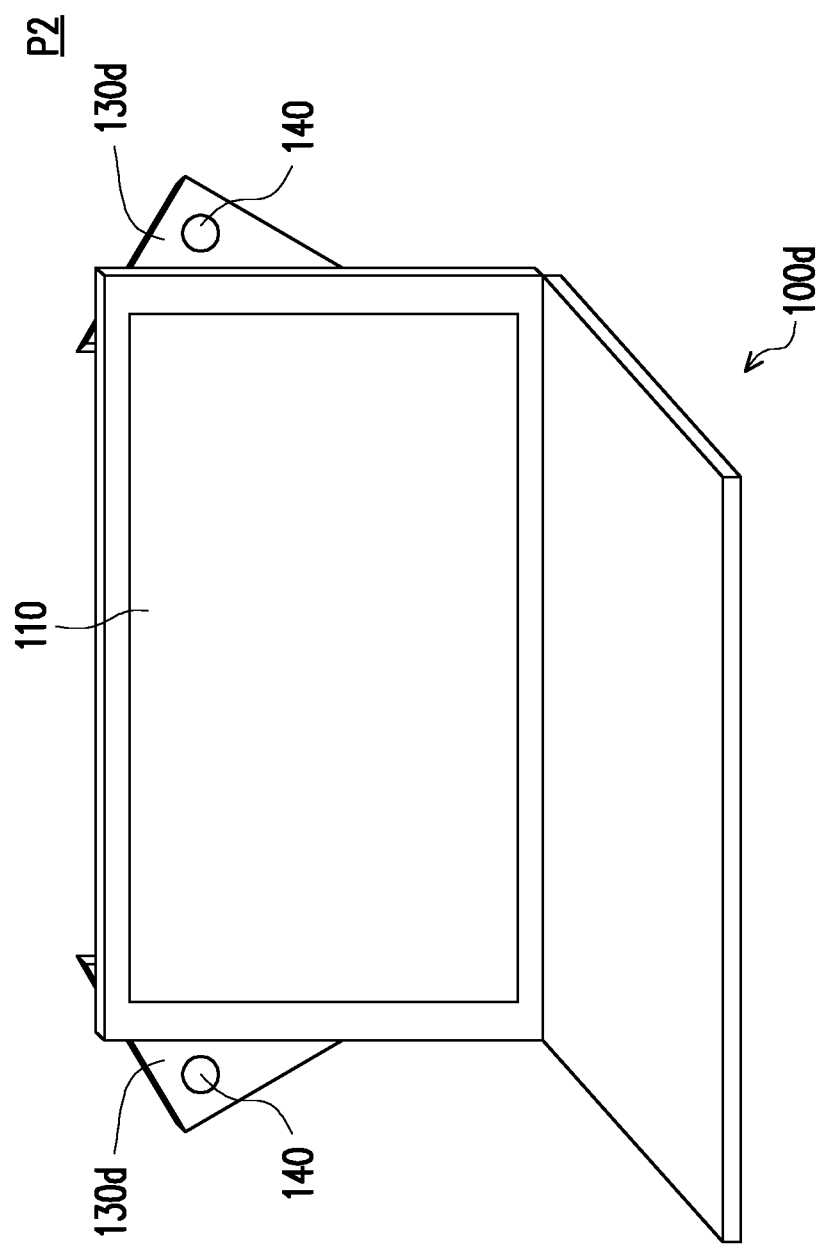

FIG. 6A to FIG. 6B are respectively schematic diagrams of an electronic device in an initial state and a spread state according to another embodiment of the invention. Referring to FIG. 1A, FIG. 1C, FIG. 6A and FIG. 6B, the electronic device 100c of the embodiment is similar to the electronic device 100a of FIG. 2B, and a main difference therebetween is that the electronic device 100d of the embodiment is embodied by a notebook. When the movable assemblies 130d are rotated from the accommodating position P1 to the operation position P2, the supplemented light sources 140 move along with the movable assemblies 130d from being hidden between the display body 110 and the movable assemblies 130d to out of the display body 110 so as to locate beside the two opposite sides of the display body 110. Namely, the movable assemblies 130d make the supplemented light sources 140 to move out of the display 110 in a rotation manner, so as to achieve the light supplement effect in a specific direction.

In summary, in the design of the electronic device of the invention, the supplemented light sources are disposed on the movable assemblies and located between the movable assemblies and the display body. When the movable assemblies are moved or rotated from the accommodating position to the operation position, the supplemented light sources move along with the movable assembly from being hidden between the display body and the movable assembly to out of the display body so as to locate beside the two opposite sides of the display body. Therefore, a light supplement effect in the specific direction is achieved. As a result, the electronic device of the invention is adapted to greatly improve the image quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
    a display body;
    a fixed back cover, disposed on the display body;
    at least one movable assembly, disposed on the display body, and located beside the fixed back cover; and
    at least one supplemented light source, disposed on the movable assembly, and located between the movable assembly and the display body,
    wherein when the movable assembly is moved or rotated from an accommodating position to an operation position, the supplemented light source moves along with the movable assembly from being hidden between the display body and the movable assembly to out of the display body so as to locate beside the display body, and
    wherein when the movable assembly is located at the accommodating position, the movable assembly and the fixed back cover have a first horizontal gap therebetween.

2. The electronic device as claimed in claim 1, further comprising:
    at least one second light source, disposed on the display body.

3. The electronic device as claimed in claim 2, wherein when the movable assembly is located at the accommodating position, the second light source is hidden between the display body and the movable assembly.

4. The electronic device as claimed in claim 3, wherein when the movable assembly is located at the operation position, the second light source is hidden between the display body and the movable assembly.

5. The electronic device as claimed in claim 3, wherein when the movable assembly is located at the operation position, the movable assembly exposes the second light source.

6. The electronic device as claimed in claim 1, further comprising:
    at least one second light source, disposed on the movable assembly.

7. The electronic device as claimed in claim 6, wherein when the movable assembly is located at the accommodating position, the second light source is hidden between the display body and the movable assembly.

8. The electronic device as claimed in claim 6, wherein when the movable assembly is located at the operation position, the second light source is hidden between the display body and the movable assembly.

9. The electronic device as claimed in claim 1, wherein a color temperature of the supplemented light source is between 2700K and 6500K.

10. The electronic device as claimed in claim 1, wherein the movable assembly comprises:
    a cover plate; and
    a linkage mechanism, connected between the cover plate and the display body to drive a non-parallel movement of the cover plate relative to the display body.

11. The electronic device as claimed in claim 10, wherein the linkage mechanism comprises:
    a first connection rod, fixed on the display body;
    a first pivot portion, disposed on the first connection rod;
    a second pivot portion, disposed on the first connection rod, and separated from the first pivot portion;
    a second connection rod, fixed on the cover plate;
    a third pivot portion, disposed on the second connection rod;
    a fourth pivot portion, disposed on the second connection rod, and separated from the third pivot portion;
    a third connection rod, pivotally connected to the first pivot portion and the third pivot portion; and
    a fourth connection rod, pivotally connected to the second pivot portion and the fourth pivot portion.

12. The electronic device as claimed in claim 11, wherein the third connection rod and the fourth connection rod are adapted to first move upward from a first tilt direction and then tilt toward a second tilt direction to drive the third pivot portion and the fourth pivot portion to move from a place adjacent to the fixed back cover toward a direction away from the fixed back cover, so as to drive the movable assembly to move from the accommodating position to the operation position.

13. The electronic device as claimed in claim 1, wherein when the movable assembly is located at the operation position, the movable assembly and the fixed back cover have a second horizontal gap therebetween, and the second horizontal gap is greater than the first horizontal gap.

14. The electronic device as claimed in claim 1, further comprising:
    a lens assembly, disposed on the display body, wherein an image captured by the lens assembly is displayed on a display surface of the display body.

15. The electronic device as claimed in claim 14, further comprising:
    a control assembly, disposed on the display body, and the display surface is located between the lens assembly and the control assembly, wherein the control assembly is configured to drive the movable assembly to move or rotate from the accommodating position to the operation position.

16. The electronic device as claimed in claim 1, further comprising:
    a base; and
    a support assembly, disposed between the base and the fixed back cover, and comprising a plurality of electric connection ports.

* * * * *